United States Patent
Chandrasekaran et al.

(10) Patent No.: US 12,164,936 B1
(45) Date of Patent: Dec. 10, 2024

(54) CONNECTED FRAMEWORK FOR IDENTIFYING AUTOMATION CANDIDATES

(71) Applicant: NTT DATA Services, LLC, Plano, TX (US)

(72) Inventors: Sankar Chandrasekaran, Chennai (IN); Krishnavelu Puliyuran, Chennai (IN); Jeyarani Rajadurai, Chennai (IN); Tanvir Khan, Allen, TX (US); Harsh Vinayak, Gurgaon (IN); Dhurai Ganesan, Chennai (IN)

(73) Assignee: NTT DATA Services, LLC, Plano, TX (US)

( * ) Notice: Subject to any disclaimer, the term of this patent is extended or adjusted under 35 U.S.C. 154(b) by 202 days.

(21) Appl. No.: 17/871,610

(22) Filed: Jul. 22, 2022

(51) Int. Cl.
*G06F 16/21* (2019.01)
*G06F 9/451* (2018.01)

(52) U.S. Cl.
CPC ............ *G06F 9/451* (2018.02); *G06F 16/211* (2019.01)

(58) Field of Classification Search
CPC ..................................................... G06F 16/211
See application file for complete search history.

(56) References Cited

U.S. PATENT DOCUMENTS

| | | | |
|---|---|---|---|
| 9,934,002 B2 | 4/2018 | Priel et al. | |
| 10,904,072 B2 | 1/2021 | Balasubramanian et al. | |
| 11,360,861 B1* | 6/2022 | Bissmeyer | G06F 11/2097 |
| 2014/0310053 A1 | 10/2014 | Liu et al. | |
| 2020/0073639 A1 | 3/2020 | Prasad et al. | |
| 2020/0356562 A1* | 11/2020 | Nayak | G06F 16/9024 |
| 2021/0192412 A1* | 6/2021 | Krishnaswamy | G06Q 10/06375 |
| 2023/0016615 A1* | 1/2023 | Villarroel Humerez Jose | G05B 13/0265 |
| 2023/0071627 A1* | 3/2023 | Kolvenbach | B01D 65/102 |

FOREIGN PATENT DOCUMENTS

AU 2019261735 A1 6/2020

* cited by examiner

*Primary Examiner* — Merilyn P Nguyen
(74) *Attorney, Agent, or Firm* — Patterson + Sheridan, LLP

(57) ABSTRACT

The method includes receiving a process dataset. The process dataset includes data related to a user-executed process. The method also includes automatically mapping the process dataset to multisource system data deemed relevant to automation of the user-executed process. The method also includes detecting a plurality of scenarios in the user-executed process via the automatically mapped process dataset. The method also includes performing scenario-based filtering of the plurality of scenarios. The method also includes automatically generating an automation recommendation for the user-executed process.

18 Claims, 6 Drawing Sheets

CONNECTED FRAMEWORK FOR IDENTIFYING AUTOMATION CANDIDATES

BACKGROUND

Technical Field

The present disclosure relates generally to the deployment and utilization of bots for automated tasks and more particularly, but not by way of limitation, to a connected framework for identifying automation candidates.

History of Related Art

Task automation, while often desirable, is not always feasible. Robotic process automation (RPA) platforms have a tendency to provide a framework for automating tasks without providing a streamlined way to determine what should be automated.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, one general aspect includes a method that is performed by a computer system. The method includes receiving a process dataset. The process dataset includes data related to a user-executed process. The method also includes automatically mapping the process dataset to multisource system data deemed relevant to automation of the user-executed process. The method also includes detecting a plurality of scenarios in the user-executed process via the automatically mapped process dataset. The method also includes performing scenario-based filtering of the plurality of scenarios. The method also includes automatically generating an automation recommendation for the user-executed process. Other embodiments of this aspect include corresponding computer systems, apparatus, and computer programs recorded on one or more computer storage devices, each configured to perform the actions of the methods.

In an embodiment, another general aspect includes a computer system. The computer system includes a processor and memory. The processor and the memory in combination are operable to implement a method. The method includes receiving a process dataset. The process dataset includes data related to a user-executed process. The method also includes automatically mapping the process dataset to multisource system data deemed relevant to automation of the user-executed process. The method also includes detecting a plurality of scenarios in the user-executed process via the automatically mapped process dataset. The method also includes performing scenario-based filtering of the plurality of scenarios. The method also includes automatically generating an automation recommendation for the user-executed process.

In an embodiment, another general aspect includes a computer-program product. The computer-program product includes a non-transitory computer-usable medium having computer-readable program code embodied therein. The computer-readable program code is adapted to be executed to implement a method. The method includes receiving a process dataset. The process dataset includes data related to a user-executed process. The method also includes automatically mapping the process dataset to multisource system data deemed relevant to automation of the user-executed process. The method also includes detecting a plurality of scenarios in the user-executed process via the automatically mapped process dataset. The method also includes performing scenario-based filtering of the plurality of scenarios. The method also includes automatically generating an automation recommendation for the user-executed process.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
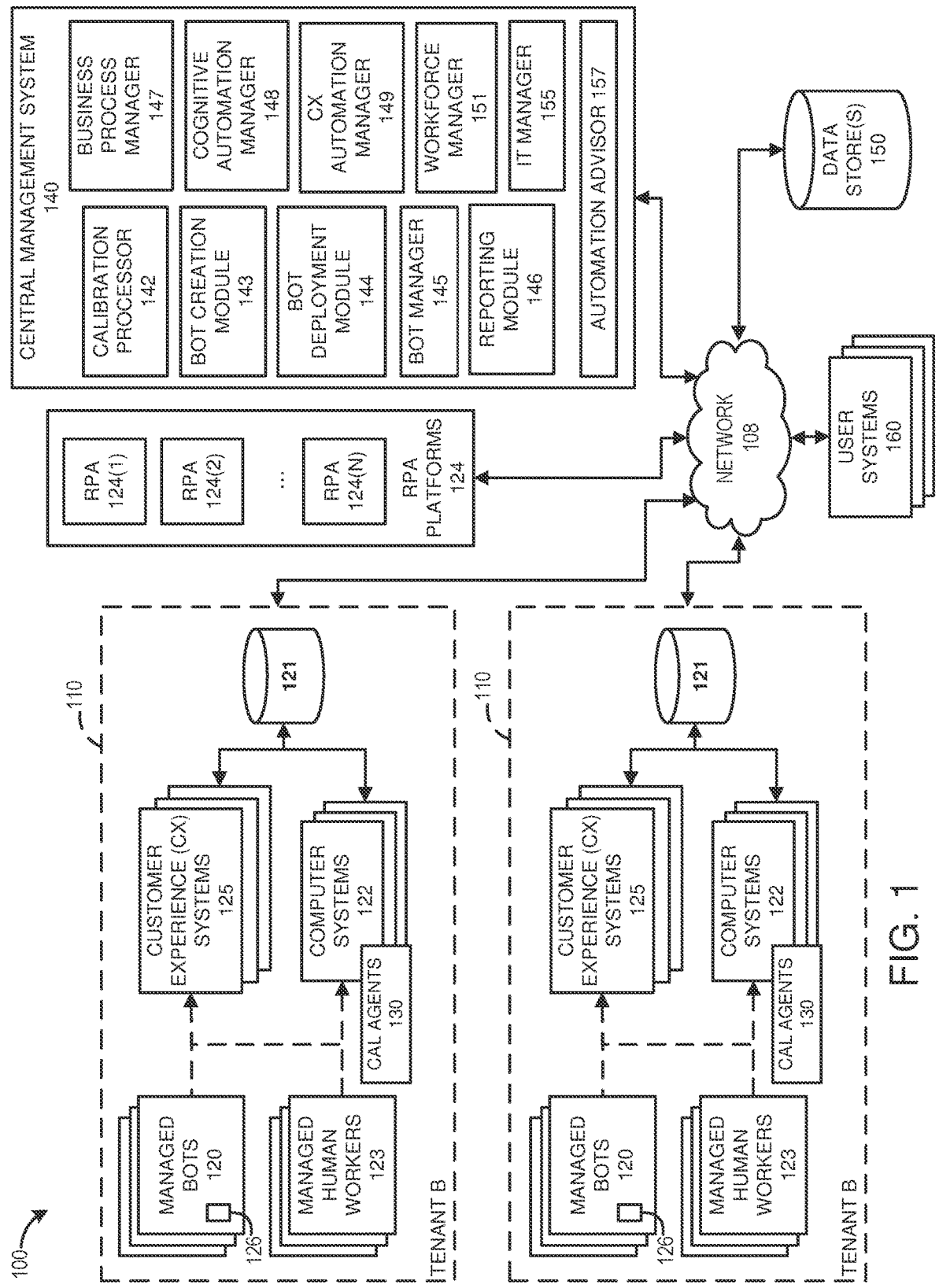
FIG. 1 illustrates an example of a system for implementing a central management system.

Robotic process automation (RPA) is the use of software, typically in combination with artificial intelligence (AI) and machine learning (ML) capabilities, to handle high-volume sequences of repeatable tasks that previously required humans to perform. These tasks can include interacting with a user interface (UI), for example, to perform queries, calculations, maintenance of records and transactions, web automations, remote operations, database functions, terminal connections, desktop operations, text operations, mouse simulations, keyboard simulations, folder operations, file handlers, clipboard handlers, combinations of the foregoing and/or the like. RPA technology can mimic a human worker, for example, by logging into applications, entering data, calculating and completing tasks, and logging out.

RPA technology is not always part of an organization's information technology (IT) infrastructure, but can instead, sit on top of it, enabling an organization to implement RPA technology quickly and efficiently, without changing the existing infrastructure and systems. In various embodiments, a computing environment can include, for example, many hundreds or thousands of software agents, often referred to herein as "bots," that automatically perform robotic processes. In various cases, the sequence of computer-implemented tasks performed by each bot can be the same or different, or a combination thereof. Oftentimes, the computing environment can further include, for example, many hundreds or thousands of human workers that likewise execute the same or similar computer-implemented tasks, or a combination thereof, via manual interaction with UIs. A set or sequence of computer-implemented tasks, such as the foregoing example tasks, may be referred to as a user-executed process.

Although bots, potentially in combination with human workers, can provide greater efficiency via increased automation, bots introduce numerous technical problems. For example, even when RPA is implemented for performing some business process, many processes continue to be performed manually. Even when automation takes over business processes, it is uncertain that the technology being used for the automation projects are efficient enough to perform those projects.

In today's competitive world of digital technology, it is more important than ever to utilize more efficient, and hence often complicated, automation systems. Many businesses nowadays adopt to automate internal business operations in order to reduce operating expenses and boost productivity. Automating business processes in the organization may be extremely advantageous, possibly allowing organization to reduce the cost of automated job activities while double their productivity. However, a botched automation project can result in resources being squandered and may prevent businesses from pursuing further automation initiatives for an extended period of time, eventually placing them behind rivals who embrace automation and make it work.

Identifying the right automation opportunity is technically difficult. An automation project's failure is sometimes ascribed to a poor use-case selection, as well as the technological solutions chosen for the initial trial or proof of concept (PoC). Furthermore, the complexity of today's digital world makes manual analysis and processing impractical. Using manual procedures results in sluggish and error-prone results, regardless of the inefficiency associated with it.

In various embodiments, intelligent automation as described herein can overcome obstacles such as those described above. The present disclosure describes examples of an automated system, functioning based on RPA, that can identify potential automation candidate for performing business processes and recommend appropriate technology to perform those business processes in order to achieve a desired outcome. In certain embodiments, an intelligent process automation model and associated method can analyze the business processes and render appropriate recommendations for automating the business processes, for example, by integrating RPA and cognitive automation technologies. Examples will be described below relative to the Drawings.

For purposes of this application, the term "UI" can include, without limitation, any type of human-machine interface. Example UIs include text-based interfaces such as command-line interfaces, conversational interfaces, crossing-based interfaces, direct manipulation interfaces, gesture interfaces, graphical UIs (GUIs), hardware interfaces, holographic UIs, intelligent UIs, motion tracking interfaces, natural-language interfaces, object-oriented UIs, reflexive UIs, touchscreen interfaces, touch UIs, voice UIs, and web-based UIs. Many of the aforementioned UIs accept input via input devices such as a keyboard, mouse, microphone, combinations of the foregoing, and/or the like. Inputs from any of these devices, in possible combination with specific UI objects or components, can be considered examples of UI events. For illustrative purposes, various examples will be described herein relative to GUIs and UI events that are detected or received in relation to GUIs. It should be appreciated, however, that the principles described herein are applicable to any type of UI, inclusive of the example UIs mentioned previously. A user, unless specifically stated otherwise, or otherwise understood within the context as used, can include any entity, including a human or bot, that can interact with a UI.

FIG. 1 illustrates an example of a system 100 for implementing a central management system 140 for user-executed processes. The system 100 includes the central management system 140, tenant systems 110, RPA platforms 124, user systems 160 and one or more data stores 150, each of which is operable to communicate over a network 108. The network 108 may be, or include, one or more of a private network, a public network, a local or wide area network, a portion of the Internet, combinations of the same, and/or the like.

In some aspects, the central management system 140 can centrally manage bot deployments on the RPA platforms 124 for its tenants. The RPA platforms 124 are shown to include an RPA platform 124(1), an RPA platform 124(2) and an RPA platform 124(N). It should be appreciated that three RPA platforms are shown among the RPA platforms 124 only for illustrative purposes. In various implementations, any number of RPA platforms can be included among the RPA platforms 124. In a typical embodiment, the RPA platforms 124 each provide RPA software for creating and executing bots, generally using different RPA technology, interfaces and formats.

In particular, in the system 100, the tenant systems 110 can be served by the central management system 140. In general, the tenant systems 110 can each be considered an abstraction of users, inclusive of both bots and human workers, that execute user-executed processes managed by the central management system 140, and the systems and data sources with which those users interact. For example, one of the tenant systems 110 is shown as owned or operated by "Tenant A" while another system 110 is owned or operated by a different tenant, "Tenant B." The tenant systems 110 shown can be owned or operated by the same or different entities. For example, Tenants A and B can represent customers (e.g., entities such as companies or individuals) of an operator of the central management system 140. Although the term "tenant" is used herein to describe the tenant systems 110 or owners/operators thereof, in addition to having its ordinary meaning, the term "tenant" can, but need not, refer to tenancy in a multitenant software architecture.

The tenant systems 110 are each shown to include one or more managed bots 120, one or more managed human workers 123, one or more computer systems 122, one or more customer experience (CX) systems 125, and one or more data sources 121. The one or more computer systems 122 can each provide a computing environment, inclusive of applications and corresponding UIs and dashboards, for executing configurable tasks. As illustrated, any given one of the computer systems 122 may be operated by one of the managed bots 120 or one of the human workers 123. In some cases, the computer systems 122 may represent desktop virtualization environments. In such cases, the human workers 123, for example, may operate the user systems 160 and access the desktop virtualization environments over the network 108.

The CX systems 125 can include a plurality of different communication systems and channels with which the managed human workers 123 and/or the managed bots 120 interact to perform their respective functions, which may include, for example, providing support to one or more supported users in the capacity of support agent. The CX systems 125 can facilitate, for example, voice communication (e.g., audio potentially in combination with video) and store recordings of the voice communication. The voice communication can be, for example, voice messages, two- or multi-way conversations between or among one or more of the managed bots 120, one or more of the managed human workers 123, and/or one or more users requesting support. In addition, or alternatively, the CX systems 125 can facilitate non-voice communication such as emails, support tickets, chat communications, chatbot communications, messaging via any suitable messaging service, combinations of the foregoing and/or the like.

The one or more data sources 121 of each of the tenant systems 110 can include data streams or datasets that can be received or processed by the computer systems 122, potentially as part of executing the configurable tasks. In various cases, the one or more data sources 121 can be updated by the computer systems 122, or other components, in real-time, on a periodic basis, e.g., according to a schedule, on-demand or a combination of the same. In various cases, the tasks for which the computer systems 122 are configured can be executed in the respective computing environments, for example, manually by the human workers 123 and/or robotically by the managed bots 120. In a typical embodiment, the managed bots 120 are each deployed on an RPA platform of the RPA platforms 124 and interact as users in the computing environments of the computer systems 122 for purposes executing some or all of the configurable tasks as robotic processes.

The managed bots 120 can each include an instruction set 126 that can be used to provide the managed bots 120 a complete set of all computer-implemented tasks or steps that are to be performed in sequence automatically by the managed bots 120, for example, as a user-executed process. In some embodiments, the instruction set 126 is in a machine-readable code that can be recognized and executed by a central processing unit. In various embodiments, the instruction set 126 can be made up of, for example, a markup language, a low-level programming language, a high-level programming language, a scripting language, a machine language, an assembly language or any combination thereof.

As illustrated, the computer systems 122 can include calibration agents 130. The calibration agents 130 are software agents that can be used to facilitate automated creation of some or all of the managed bots 120. In certain embodiments, the calibration agents 130 can be individually triggered, for example, by a human user of one of the user systems 160, to monitor and record user activity in the computing environments provided by the computer systems 122. The user activity can represent, for example, user-executed processes in the computing environments. The user activity can include, for example, UI activity.

In the illustrated embodiment, the central management system 140 can include a calibration processor 142, a bot creation module 143, a bot deployment module 144, a bot manager 145, a reporting module 146, a business process manager 147, a cognitive automation manager 148, a CX automation manager 149, a workforce manager 151, an IT manager 155, and a process automation advisor 157. Each of these components can be implemented with hardware and/or software, including (optionally) virtual machines and containers. In an example, the central management system 140 can be implemented as a single management server. In another example, the central management system 140 can be implemented in a plurality of virtual or physical servers, which may or may not be geographically co-located. In some embodiments, the central management system 140 and/or other aspects of the system 100 may be hosted on a cloud-provider system.

In certain embodiments, features of the components of the central management system 140 can be made accessible over an interface to the user systems 160. The user systems 160 can include any type of computing device, including desktops, laptops, tablets, and smartphones, to name a few. The user systems 160 can be operated by users, such as the human workers 123, or by other users, for example, for administration purposes.

The calibration processor 142 can, for each of the tenant systems 110, in collaboration with the calibration agents 130, monitor execution of user-executed processes by the managed bots 120 and/or the human workers 123. Operation of the calibration processor 142 and the calibration agents 130 will be described in greater detail relative to FIG. 2.

The bot creation module 143 can be utilized to create bots such as, for example, the managed bots 120. In some embodiments, an instruction set is created via the bot creation module 143 that contains all of the instructions and/or modules for a specific type of bot. The instruction set that is created can be similar to the instruction set 126 of each of the managed bots 120. In certain embodiments, the bot creation module 143 can utilize information from the calibration processor 142 and/or the process automation advisor 157, for example, to automatically create each instruction set. In some embodiments, the bot creation module 143 includes or provides a configuration interface for manual creation of an instruction set, or for revision or tuning of an automatically created instruction set. The configuration interface can be accessible, for example, by the user systems 160.

In certain embodiments, the bot deployment module 144 can be utilized to deploy a bot on the RPA platforms 124 for a tenant, such that the deployed bot becomes one of the managed bots 120. In various embodiments, the bot deployment module 144 can utilize an instruction set created by the bot creation module 143 that can then be deployed. For example, the instruction set 126 of one of the managed bots 120 could be representative of a bot created by the bot creation module 143 and then deployed via the bot deployment module 144. In certain embodiments, the bot deployment module 144 can be used to deploy a single bot and/or a plurality of bots concurrently. In many cases, the bot deployment module 144 can be utilized to deploy bots on a variety of the RPA platforms 124. In some embodiments, the bot deployment module 144 can publish a configuration interface to the user systems 160, for example, for administrators, super users or other users (e.g., of a particular tenant) to select or specify such commands. In other embodiments, the bot deployment module 144 executes an automatic process to deploys bots without manual interaction. In various embodiments, the bot deployment module 144 can store command sets for some or all of the RPA platforms 124.

The bot manager 145 can serve to manage bots such as, for example, the managed bots 120, for tenants. In certain embodiments, the bot manager 145 can issue commands to control operation of bots. The bot manager 145 can be utilized to re-configure, optimize and/or customize any of the managed bots 120. For example, various commands can start or stop bots, perform configuration management, combinations of the same and/or the like. In some cases, the bot manager 145 can publish a configuration interface to the user systems 160, for example, for administrators, super users or other users (e.g., of a particular tenant) to select or specify such commands.

The reporting module 146 can generate regular or on-demand reports related to the managed bots 120 and the managed human workers 123. In various cases, these reports can provide a snapshot of some or all of the managed bots 120 and the managed human workers 123 (e.g., regarding performance gaps as described further below). The reporting module 146 can publish reports or other generated information, for example, to a webpage, user dashboard, and/or the like. The reporting module 146 can generate and execute a query of the one or more data stores 150, as appropriate. The web page, user dashboard or other UI(s) output, for example, by the reporting module 146, can be accessed by certain users of the user systems 160.

The business process manager 147 includes tools and interfaces to manage business processes in the system 100, inclusive of user-executed processes. For example, the business process manager 147 can maintain, for the tenant systems 110, business process specifications as a series of tasks, dependencies between business processes, combinations of the foregoing and/or the like.

The cognitive automation manager 148 can orchestrate cognitive automation in the system 100, for example, as may be implemented by the managed bots 120. In various embodiments, the cognitive automation manager 148 can manage, track, and/or implement some or all instances of intelligent process automation that are used by or with respect to the tenant systems 110. In certain embodiments, the cognitive automation manager 148, in combination with other elements of the system 100, utilizes continuous learning, automatic recommendations, and automatic scoring and decision-making features to optimize ML technologies for process automation.

The CX automation manager 149 can orchestrate and manage the CX systems 125 of the tenant systems 110. In certain embodiments, the CX automation manager 149 collects granular data regarding utilization of the CX systems 125, including details of interactions that take place using the CX systems 125. In addition, or alternatively, the CX automation manager 149 can control operation of the CX systems 125. The workforce manager 151 can include one or more workforce management systems that are used to manage, control, and track, for example, the managed human workers 123 for each of the tenant systems 110. The IT manager 155 can include software and interfaces for managing, controlling, and tracking, for example, the computer systems 122.

The process automation advisor 157 can, for each of the tenant systems 110, in collaboration with the calibration agents 130, monitor execution of user-executed processes by the managed bots 120 and/or the human workers 123. In various embodiments the process automation advisor 157 integrates data from numerous data sources, such as various components of the tenant systems 110 and/or the central management system 140, to facilitate automation of user-executed processes. Operation of the process automation advisor 157 and the calibration agents 130 will be described in greater detail relative to FIGS. 3-5.

In general, the one or more data stores 150 can include any information collected, stored or used by the central management system 140. For example, in various embodiments, the one or more data stores 150 can include instruction sets for bots, command sets for one or more of the RPA platforms 124, deployment settings for bots (e.g., on a tenant-specific and/or bot-specific basis), metadata for bots to be deployed, data collected from the managed bots 120, the human workers 123, the computer systems 122 or the CX systems 125, combinations of the same and/or the like. In certain embodiments, data stored in the one or more data stores 150 can take the form of repositories, flat files, databases, etc. In certain embodiments, the one or more data stores 150 can be utilized as an event library, in which actions performed by any of the managed bots 120 and/or the user systems 160 are stored. The event library can also contain business rule libraries, exception libraries, control libraries, keyboard libraries, database libraries and/or cognitive libraries.

Figure 2:
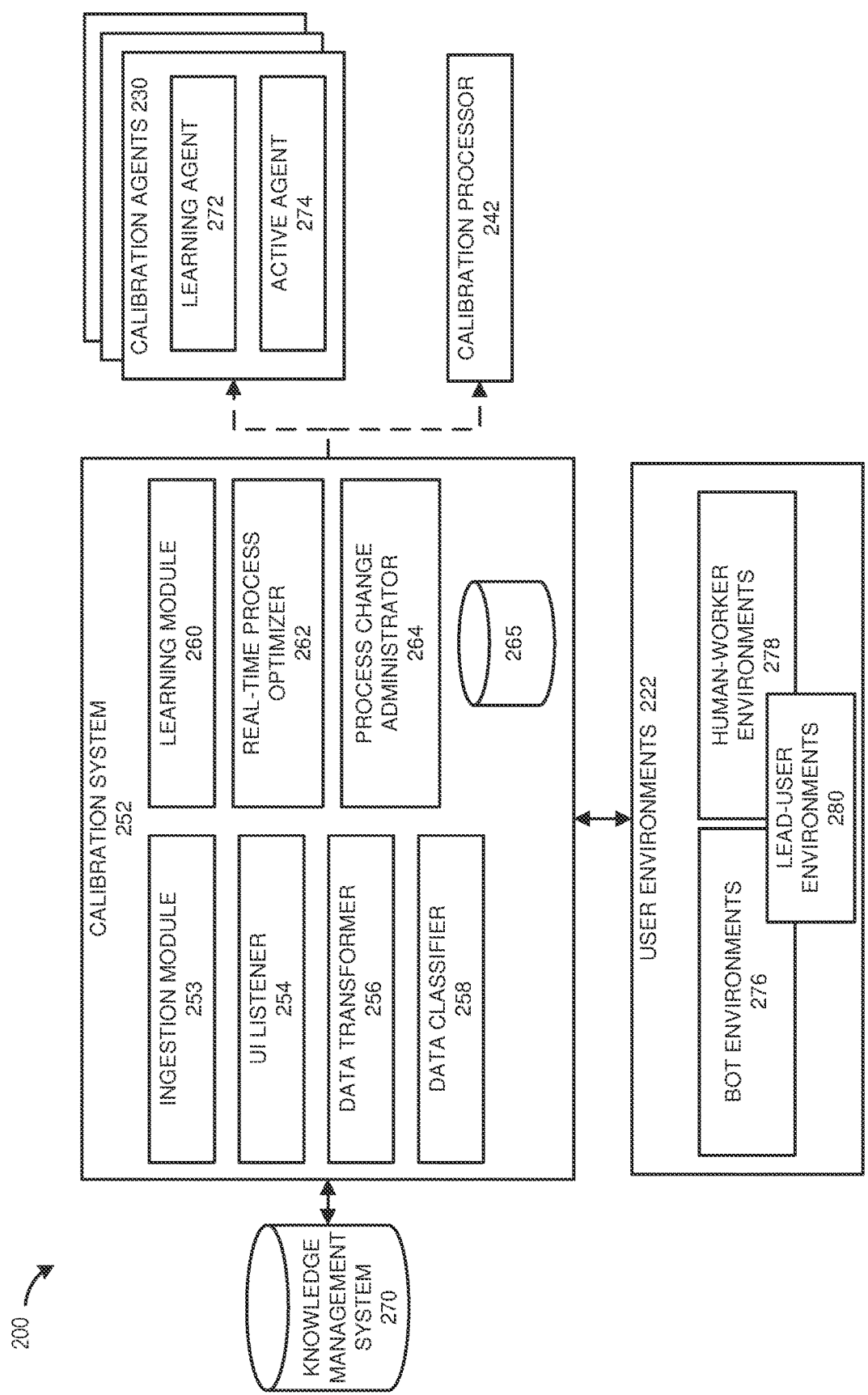
FIG. 2 illustrates an example of an environment for a calibration system for a user-executed process.

FIG. 2 illustrates an example of an environment 200 for a calibration system 252 for a user-executed process. Although the environment 200 is described relative to a single user-executed process for illustrative purposes, it should be appreciated that the system 100 of FIG. 1, for example, can support a plurality of such environments for a plurality of user-executed processes. The environment 200 includes the calibration system 252, a knowledge management system 270, calibration agents 230, a calibration processor 242 and user environments 222.

The user environments 222 can correspond to user environments provided, for example, by the computer systems 122 of FIG. 1. As illustrated, the user environments 222 include bot environments 276, human-worker environments 278, and lead-user environments 280. The bot environments 276 are generally operated by bots such as the managed bots 120 of FIG. 1 The human-worker environments 278 are generally operated by human workers such as the managed human workers 123 of FIG. 1.

In general, the lead-user environments 280 are a subset of the user environments 222 that serve, for example, as a basis for incremental learning. In some embodiments, the lead-user environments 280 can include, for example, a subset of the human-worker environments 278 corresponding to specific human workers who have been designated as such, for example, due to their human expertise. However, generally speaking, the lead-user environments 280 can include some or all of the bot environments 276, some or all of the human-worker environments 278, or a selected combination of certain of the bot environments 276 and certain of the human-worker environments 278.

The calibration system 252 is configured to calibrate different types of users, such as the managed bots 120 and the managed human workers 123 of FIG. 1, for execution of the user-executed process. The calibration system 252 includes an ingestion module 253, a UI listener 254, a data transformer 256, a data classifier 258, a learning module 260, a real-time process optimizer 262, and a process change administrator 264. As illustrated, in various embodiments, operation of the calibration system 252 can be distributed between the calibration agents 130 and the calibration processor 142 in any suitable fashion. In general, the calibration agents 230 and the calibration processor 242 can each operate as described relative to the calibration agents 130 and the calibration processor 142, respectively, of FIG. 1.

The knowledge management system 270 can include data related to how the user-executed process is executed. In various examples, the knowledge management system 270 can include, for example, process documents, knowledge base files, system alerts, on-screen tips, bite-sized training materials and/or help files in video, audio, image and document formats. The data of the knowledge management system 270 can be received or retrieved from other users (e.g., bots and/or human workers) and/or from systems used for training, for example, new human workers. Document formats can include, for example, one or more of Portable Document Format (PDF), Microsoft (MS) Office formats including MS Word, MS PowerPoint (PPT) and MS Excel, and image formats including Joint Photographic Experts Group (JPEG), Portable Network Graphics (PNG) and Graphic Interchange Format (GIF). The knowledge management system 270 can be stored, for example, in the one or more data stores 150 of FIG. 1.

The ingestion module 253 is operable to collect, or ingest, the data of the knowledge management system 270. In various embodiments, the data can be indexed and stored, for example, in a data store 265. As will be described in greater detail below, the collected or ingested data from the knowledge management system 270 can be used, in part, to execute machine learning relative to the user-executed process. In various embodiments, the machine learning, once complete, can reduce or eliminate a need for users to directly access and refer to documents or other data in the knowledge management system 270.

The UI listener 254 monitors and records UI activity in the user environments 222. For example, the UI listener 254 can periodically or continuously receive a live screen output of each of the user environments 222 and record UI activity data based thereon. In certain embodiments, the live screen output can include, for example, one or more UIs that present a data-entry screen for users to perform data entry.

In various embodiments, a given data-entry screen may be, or be included as part of, a text terminal, a browser window, a container window that encloses other windows or widgets, message windows or dialog boxes, a child window opening as a result of user activity in a parent window (e.g., a popup window), a combination of the foregoing and/or the like. Each data-entry screen can include, for example, various control elements with which a user interacts to perform data entry. These control elements can include, for example, radio buttons, check boxes, toggle switches, sliders, list boxes, spinners that step through ranges of values, drop-down lists, menus, menu bars, toolbars, ribbons, text boxes, combo boxes (e.g., combining drop-down list or list box and a text box), icons, tables, tabs, scrollbars, any other suitable UI feature, combinations of the foregoing and/or the like. Some or all of these control elements may be associated, for example, with text labels or graphical icons, depending on a type of interface.

In an example, the UI listener 254 can use image-recognition technology, optical character recognition (OCR) technology and/or the like to identify individual control elements of the type described above along with specific data entered thereby (e.g., selections, text entries, or the like). The UI listener 254 can further identify a location of each individual control element within each UI (e.g., using coordinates). According to this example, the UI listener 254 can generate and/or record, for example, data related to the individual control elements, including data entered thereby and their location within each UI.

In another example, the UI listener 254 can detect UI events in a given UI in relation to the live screen output. As described previously, the UI events can correspond to input from various input devices such as a keyboard, mouse, microphone, touchscreen, combinations of the foregoing and/or the like. Thereafter, the UI listener 254 can determine target application(s) for each detected UI event(s). Generally, the target application(s) are executing in a respective computing environment and provide at least part of a UI with which a given user interacts. The target application(s) may include, for example, an application to which the detected UI event(s) are directed, for example, as a result of being in focus or as a result of providing a UI object, component or control element to which the detected UI event(s) relate. Examples include, but are not limited to, an application that provided a text box for receiving text (keyboard event) and an application that is clicked (mouse click event).

The data transformer 256 can transform data obtained or collected by the ingestion module 253 and/or the UI listener 254. In certain embodiments, the ingestion module 253 and/or the UI listener 254 collects various data of the type above, which data may be referred to generically as heterogeneous transaction data. Such heterogeneous transaction data may exist or be compiled in different formats. In various embodiments, the data transformer 256 can homogenize such data into homogeneous transaction data. For example, with reference to the data produced by the UI listener 254, the information related to the individual control elements can be resolved to specific data fields to which the control elements relate (e.g., with a homogenized data-field name and value format). The previously mentioned locations of such control elements can thereby refer to locations of these data fields, sometimes referred to herein as data-field locations. Continuing this example, in certain embodiments, the data transformer 256 can create a dataset representing the live screen output and/or a UI therein, where the dataset represents the homogeneous transaction data. In some cases, the dataset can be in a structured format that is represented, for example, using XML.

The data classifier 258 classifies, using a machine learning algorithm, the homogeneous transaction data based on various parameters such as, for example, data fields and values. In various cases, the data classifier 258 can classify using, for example, artificial neural networks, decision trees, ensemble learning, and/or the like. The classified data can be stored, for example, in the data store 265.

The learning module 260 can initially create a plurality of machine-learning models based on an initial set of classified data, where each machine-learning model can correspond to a specific target UI, a user-executed process, and/or a step or task of a user-executed process. Thereafter, the learning module 260 can facilitate incremental learning based on new classified data from the data classifier 258. For example, the learning module 260 can select a target UI or process steps for the new classified data and provide the new classified data as input data for the corresponding machine-learning model(s). In various embodiments, the learning module 260 can thereby learn and associate UI data with specific steps or tasks of the user executed process as represented, for example, in an instruction set similar to the instruction set 126 of FIG. 1. For each machine-learning model, the learning module 260 can evaluate readiness to assist in process optimization, for example, through an evaluation of confidence threshold or the like. In various embodiments, the learning module 260 can restrict learning, for example, to classified data originating from user activity in the lead-user environments 280.

The real-time process optimizer 262 uses the plurality of machine-learning models of the learning module 260 to monitor execution of the user-executed process in the user environments 222. In some aspects, the real-time process optimizer 262 continuously or periodically receives new classified data for individual user environments of the user environments 222 as real-time UI activity data. The real-time process optimizer 262 uses the real-time activity data to track process execution, identify process discrepancies, and provide process guidance. In various embodiments, the real-time process optimizer 262 can execute functionality for individual ones of the user environments 222 and/or on an aggregate level across all of the user environments 222 or any subset thereof.

In various embodiments, with respect to tracking process execution for an individual user environment, the real-time process optimizer 262 can correlate the real-time UI activity data to a plurality of steps of the user-executed process as represented, for example, in an instruction set similar to the instruction set 126 of FIG. 1. In an example, the real-time process optimizer 262 can compare the real-time UI activity data to UI data associated with the plurality of steps of the user-executed process, match the real-time UI activity data to one or more steps of the user-executed process, and update a tracking status of the user-executed process (e.g., which step or task has been completed or is currently being executed).

In various embodiments, with respect to identifying process discrepancies, the real-time process optimizer 262 can identify anomalies in the real-time UI activity data as process discrepancies. In general, a process discrepancy can be any UI activity data or process performance that is anomalous or irregular for the user-executed process, for example, based on a machine-learning model, rules, or other logic for the user-executed process. Irregularity can be determined in any suitable fashion such as based on a confidence score or other metric. In some embodiments, the real-time process optimizer 262 can identify missed steps by detecting that one or more tasks steps have been, or are being, performed, while one or more prior steps or tasks have not been performed. The one or more prior steps can be considered missed steps.

In various embodiments, the real-time process optimizer 262 can detect a process discrepancy as a new process scenario for triggering change management. In various embodiments, a new process scenario can be any detected situation that changes how the user-executed process is performed. In some cases, the real-time process optimizer 262 can detect a UI change as a new process scenario. For example, as mentioned previously, the real-time process optimizer 262 can compare the real-time UI activity data to UI data associated with the plurality of steps of the user-executed process and match the real-time UI activity data to one or more steps of the user-executed process. In some embodiments, the real-time process optimizer 262 can thereafter determine that the UI for a particular step has changed, for example, as a result of not having the same control elements in the same locations within the UI as compared to the UI data associated with the particular step. In an example, a particular data field, such as a password data field, may have been relocated within the UI. According to this example, the UI change embodied by the relocated data field can be detected as a new process scenario. In some embodiments, a given UI change may not be detected as a new process scenario until such change is identified in a threshold number of user environments and/or a threshold number of times.

In some cases, the real-time process optimizer 262 can detect a change to the user-executed process itself as a new process scenario. For example, as mentioned previously, the real-time process optimizer 262 can detect process irregularity, for example, specific user environments, such as in the lead-user environments 280, as a new process scenario. In an example, a task or other user action that does not match to a step of the user-executed process may be detected as a new step. In another example, a task or other user action that appears to be performed out of order may be detected as a step reordering. In yet another example, a new UI for which the UI activity data does not match to any step of the user-executed process may be detected as a new or added step or series of steps. In still another example, a task or step that is no longer performed may be detected as a step that may be omitted or deleted. In some embodiments, a given change to the user-executed process may not be detected as a new process scenario until such change is identified in a threshold number of user environments and/or a threshold number of times.

In various embodiments, with respect to providing process guidance, the real-time process optimizer 262 can generate a recommended next step or other recommendation, for example, based on a machine-learning model for the user-executed process. The recommended next step or other recommendation can be determined based on a confidence score or other metric. In some embodiments, the next step or recommendation can be presented in a respective user environment of the user environments 222. In another example, the real-time process optimizer 262 can validate, for example, user input in data fields. The validation can be performed based on a confidence score or other metric. Failed validation can be indicated, for example, as an error in the respective user environment of the user environments 222. In various embodiments, real-time process-guidance functionality can be particularly advantageous for human workers such as the managed human workers 123 of FIG. 1. In certain embodiments, the need to access the knowledge management system 270 can be reduced or eliminated.

As mentioned above, in various embodiments, the real-time process optimizer 262 can execute functionality on an aggregate level across all of the user environments 222 or any subset thereof, where all data used or generated thereby can be stored in the data store 265. In certain embodiments, performance of the user-executed process by different users and sets of users can be compared for purposes of identifying performance gaps. Performance can be measured based on any suitable metric such as, for example, errors, process discrepancies, time to complete a transaction (e.g., in terms of mean, median, or the like), total number of completed transactions, a composite of the foregoing and/or the like. In various embodiments, performance can be measured for a user or for a set of users. According to this example, such performance can be compared to a baseline, where sufficient deviation from the baseline constitutes a performance gap. In an example, the baseline can be a predefined baseline with threshold values for the performance under consideration. In another example, the baseline can be a statistical baseline that is compiled across all users or for a particular set of users such as, for example, lead users operating the lead-user environments 280, bots operating the bot environments 276, human workers operating the human-worker environments 278, and/or the like. In various embodiments, performance gaps can be identified for individual users relative to the lead users, bots relative to the lead users, human workers relative to bots, and/or the like.

The process change administrator 264 can interact with the real-time process optimizer 262 and/or other components to automatically address new process scenarios. In various embodiments, the process change administrator 264 can determine, as appropriate, new bot logic for the new process scenario and cause the new bot logic to be implemented, for example, by the managed bots 120 which execute the user-executed process. The new bot logic can be, for example, an update to the instruction set for the user-executed process. In an example, the process change administrator 264 can indicate a new location of a particular data field such as a password data field. In another example, the process change administrator 264 can add a new step such as, for example, clicking a "next" button that was not previously present. In yet another example, the process change administrator 264 can reorder steps represented in the instruction set. In various embodiments, process change administrator 264 can update the bots with the new bot logic, for example, by automatically creating an updated version of the same bots (or creating new bots) and deploying or re-deploying such bots.

The calibration agents 230 can execute in the user environments 222 and can include a learning agent 272 and an active agent 274. In various embodiments, the learning agent 272 of the calibration agents 230 can include agent-level functionality related to learning (e.g., agent-level functionality of the UI listener 254 and the learning module 260). In various embodiments, the active agent 274 of the calibration agents 230 can include agent-level functionality related to process optimization (e.g., agent-level functionality of the real-time process optimizer 262). The active agent 274 can provide notifications, for example, in the form of popups, dashboard updates, or the like. Such notifications can relate, for example, to process discrepancies, errors, recommendations, failed validations, or the like as described above relative to the real-time process optimizer 262.

Figure 3:
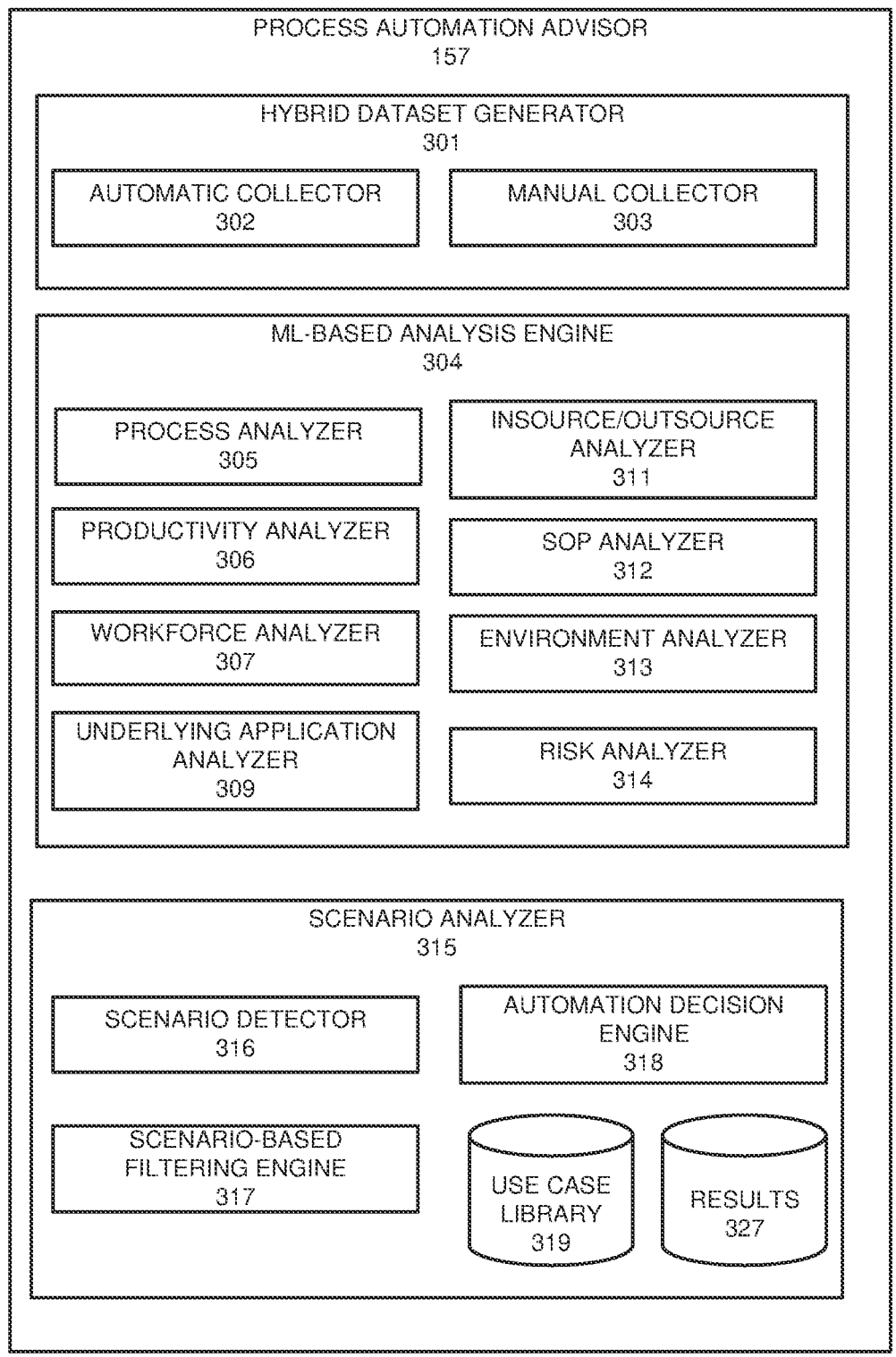
FIG. 3 illustrates an example of a process automation advisor.

FIG. 3 illustrates an example of the process automation advisor 157. Although the process automation advisor 157 is described relative to a single user-executed process for illustrative purposes, it should be appreciated that the system 100 of FIG. 1, for example, can support a plurality of such environments for a plurality of user-executed processes. The process automation advisor 157 includes a hybrid dataset generator 301, a ML-based analysis engine 304, and a scenario analyzer 315.

The hybrid dataset generator 301 includes an automatic collector 302 and a manual collector 303. In various embodiments, the automatic collector 302 and the manual collector 303 can operate individually, or in combination, to generate a business process dataset related to a user-executed process. The business process dataset can include information describing a user-executed process such as, for example, identification of a plurality of steps that are performed as part of the user-executed process, data describing how the user-executed process is executed (e.g., technical documentation), data sources that are accessed in each step of the user-executed process, applications and UIs of the application that are used in each step of the user-executed process, other data related to a user-executed process such as the data described herein, combinations of the foregoing and/or the like. In some cases, the level of detail regarding the plurality of steps can be similar to that of the instruction set 126 of FIG. 1.

In various embodiments, the automatic collector 302 generates the business process dataset, at least in part, using the calibration system 252. In some embodiments, the automatic collector 302 can trigger the calibration system 252 to generate any data the system is operable to produce. In this way, the automatic collector 302 can receive, or retrieve, any data accessed, generated, or stored by the calibration system 252 relative to the user-executed process. For example, the automatic collector 302 can retrieve, or receive, ingested data from the knowledge management system 270 that describes the user-executed process. In another example, the automatic collector 302 can retrieve, or receive, recorded UI activity data that has been automatically correlated to a plurality of identified steps of the user-executed process. The recorded UI activity data can include, for example, data related to detected UI events, target applications for the detected UI events, UI objects, components or control elements to which each detected UI event relates, and/or the like. In other examples, the automatic collector 302 can receive or retrieve, for the user-executed process, homogenous transaction data, classified homogenous transaction data, or any other data related to the user-executed process that is available to the calibration processor 142. In some embodiments, the automatic collector 302 can collect some or all of the data by decoding an augmented shareable video file for the user-executed process as described in U.S. Pat. No. 10,817,314, where any information decoded from such file, such as UI metadata, can serve as part of the business process dataset. U.S. Pat. No. 10,817,314 is hereby incorporated by reference.

In various embodiments, the manual collector 303 can generate the business process dataset, at least in part, via interaction with an administrator, super user, or other user. For example, in some embodiments, the manual collector 303 solicits and receives at least a portion of the business process dataset using a web form or similar method. In some embodiments, the manual collector 303 can be used to fill information gaps, for example, due to some information not being available for automatic generation by the automatic collector 302. For instance, in some embodiments, the manual collector 303 can solicit and receive information regarding locations of data sources that are used in the user-executed process.

In general, the business process dataset generated by the hybrid dataset generator 301 can include all or any subset of the example data mentioned above. The business process dataset can also include additional data that will be apparent to one skilled in the art after a detailed review of the present disclosure. It should be appreciated that, in various embodiments, the business process dataset can be generated entirely automatically by the automatic collector 302, entirely non-automatically by the manual collector 303, or part automatically and part non-automatically via a configurable combination of the automatic collector 302 and the manual collector 303.

The ML-based analysis engine 304 automatically maps the business process dataset produced by the hybrid dataset generator 301 to multisource system data that is retrieved from a variety of sources. In the illustrated embodiment, the ML-based analysis engine includes a process analyzer 305, a productivity analyzer 306, a workforce analyzer 307, an underlying application analyzer 309, an insource/outsource analyzer 311, a standard operating procedure (SOP) analyzer 312, an environment analyzer 313, and a risk analyzer 314. As described in greater detail below, the multisource system data to which the business process dataset is mapped can include, for example, preexisting datasets used by the foregoing modules.

Still referring to the ML-based analysis engine 304, the process analyzer 305 can perform, for example, business process assessment, domain catalog mapping, sub-process analysis, automation existence analysis, process stability analysis, and/or decision-making analysis. The productivity analyzer 306 can perform, for example, process schedule assessment, repetitive task analysis, volume analysis, average handle time (AHT) analysis, peak time analysis, peak volume analysis, service-level agreement (SLA) analysis, process change analysis, and/or process history analysis. The workforce analyzer 307 can perform, for example, role mapping analysis, regional workforce analysis, stakeholder mapping, absenteeism analysis and/or attrition analysis.

Still referring to the ML-based analysis engine 304, the underlying application analyzer 309 can perform, for example, application touchpoint analysis, application downtime analysis, application environment analysis, and/or application stability analysis. The insource/outsource analyzer 311 can perform, for example, data input and output analysis, information analysis, and/or storage analysis. The SOP analyzer 312 can perform, for example, process SOP assessment, and/or Suppliers, Inputs, Process, Outputs and Customer (SIPOC) analysis. The environment analyzer 313 can perform, for example, server environment analysis, latency analysis, and/or downtime analysis. The risk analyzer 314 can perform, for example, negative scenario analysis, issue analysis, data security analysis, password policy analysis and/or preexisting issue analysis.

In various embodiments, the modules of the ML-based analysis engine 304 can each have one or more preexisting datasets they work with or use for a given analysis, where such preexisting datasets, in a typical embodiment, are not particular to the user-executed process at issue. The preexisting datasets can be very large and, depending on the specific module, can include, for example, workforce management data, application data repositories, CX automation data, cognitive automation data, general business process data, bot data, other data, and/or the like. In such embodiments, each module of the ML-based analysis engine 304 can perform its functionality via one or more ML models. For each module, the ML model(s) are trained to receive a business process dataset, determine relevant data within the preexisting datasets that it works with (e.g., using any suitable relevance thresholds), and then perform one or more specific types of analysis using that relevant data. In this way, the modules of the ML-based analysis engine 304 can each automatically map the business process dataset to its respective preexisting datasets, and the mapping can result in, and be evidenced by, specific analytical data, depending on module type, that ties the business process dataset to the preexisting datasets. Generally, this specific analytical data would not otherwise be relatable to either the business process dataset or the user-executed process at issue because it is stored and maintained by a discrete system or component that exists independently.

The scenario analyzer 315 includes a scenario detector 316, a scenario-based filtering engine 317, an automation decision engine 318, a use case library 319, and a results datastore 327. The use case library 319 can specify a set of defined uses cases that, in various instances, can be performed as all or part of user-executed processes. In general, the use case library 319 provides at least some information relevant to automation decisions for the same or similar use cases. In various embodiments, the use case library 319 can represent common use cases for a tenant, common uses cases across multiple tenants, use cases that are generally common in industry or in a subset of industry, combinations of the foregoing and/or the like. For example, the use case library 319 can identify use cases for which prior automation decisions have been made, such as prior decisions to automate, prior decisions to partially automate and/or prior decisions not to automate, etc. In various embodiments, the use case library 319 streamlines its use in scenario detection by storing use case data that is structured or formatted similarly to business process datasets and/or mapped business process datasets as described above.

The scenario detector 316 can leverage the use case library 319 to detect one or more scenarios, also referred herein as use cases, that are represented in the mapped business process dataset. In some embodiments, the business process dataset and/or the automatically mapped business process dataset can be formatted or structured in a standardized manner to facilitate matching of the same to use cases of the use case library 319. In some embodiments, the scenario detector 316 can perform its detection functionality via an ML model that is trained to match business process datasets and/or mapped business process datasets to the use case library 319. It should be appreciated that the user-executed process can include one scenario or multiple scenarios.

Still referring to the scenario detector 316 and the use case library 319, in some embodiments, configurable use-case signatures can be generated and/or used to facilitate comparison. The use-case signature can include any data related to a use case, such as any of the data described above relative to the business process dataset or the mapped business process dataset. For example, certain data fields (e.g., application, combination of applications, user type, etc.) can be established as a signature definition for a use case represented in the business process dataset and the mapped business process dataset. In similar fashion, the same certain data fields can be used to represent the use cases of the use case library 319. Thus, in various embodiments, a match can be determined between the user-executed process under analysis and one or more use cases of the use case library 319 whenever configurable matching criteria is satisfied. The configurable matching criteria can be specified, for example, in terms of number of field matches or a percentage of field matches. In addition, or alternatively, the configurable matching criteria can require that certain fields or certain combinations of fields match or sufficiently match. It should be appreciated that the foregoing matching example is presented only for simplicity of illustration and that numerous other scenario-detection methods are likewise contemplated. Such methods will be apparent to one skilled in the art after a detailed review of the present disclosure.

The scenario-based filtering engine 317 can perform scenario-based filtering based, at least in part, on identified use cases. In some embodiments, the scenario-based filtering engine 317 can operate by analyzing, for example, data related to an application or applications that are utilized in the user-executed process under analysis. In some embodiments, the scenario-based filtering engine 317 can perform collaborative filtering and/or relational filtering. In certain embodiments, the scenario-based filtering engine 317 can output a filtered scenario set, which set can include all scenarios or any subset of the scenarios detected by the scenario detector 316.

In some embodiments, the scenario-based filtering engine 317 provides a personalized recommendation based on business processes or accounts. The scenario-based filtering engine 317 employs similarities in the scenarios that were the result obtained through data such as, but not limited to, previous iterations, information accumulated pertaining to business/process, and the like, to generate or make recommendations. The scenario-based filtering engine 317 also provides personalized recommendations based on the user preferences and similar scenarios, thereby offering better recommendations to a process.

In an example recommendation scenario, the scenario-based filtering engine 317 recommends a process scenario to a user based on a determined similarity with another business or process. Apart from predefined parameters such as, but not limited to, business, industry, process type, and the like, a business profile may indicate prior scenarios as process 1, process 2, process n, etc. In some embodiments, an automation recommendation may suggest similar processes and/or automation candidates for a new business based on parameters or attributes such as the foregoing. In the aforesaid example, the user would expect recommendations for similar automation candidates, but process similarity for a specific account may be something they did not expect yet appreciate.

The automation decision engine 318 can generate one or more automation candidates relative to the user-executed process. In some embodiments, the automation candidates can correspond to any detected scenarios from the use case library 319 that remain after filtering by the scenario-based filtering engine 317. In other embodiments, the automation decision engine 318 can receive the filtered scenario set from the scenario-based filtering engine 317 and execute logic to determine whether automation is recommended. In some embodiments, the automation decision engine 318 can perform its decision functionality via an ML model that is trained to receive the filtered scenario set and produce one or more automation recommendations. The automation recommendations can include recommendations to automate all or a portion of the user-executed process. In some embodiments, the automation recommendations can include recommendations not to automate all or a portion of the user-executed process. Automation recommendations can include, for example, identification of specific technologies such as, for example, a CX automation platform, an RPA platform, etc. Results produced by the automation decision engine 318 and/or any other module of process automation advisor 157 can be stored in the results datastore 327 or in other memory.

In some embodiments, the automation decision engine 318 can publish its recommendations to an administrator or other user. In some of these embodiments, if the administrator or other user accepts the recommendation, the ML model of the automation decision engine 318, if applicable, can be updated based on the recommendation, thereby using the recommendation as training data. In some embodiments, the automation decision engine 318 can automatically implement the recommendation, either with or without user acceptance of the recommendation, depending on system configuration, for example, by automatically creating and deploying one or more bots having instruction sets corresponding to the user-executed process.

Figure 4:
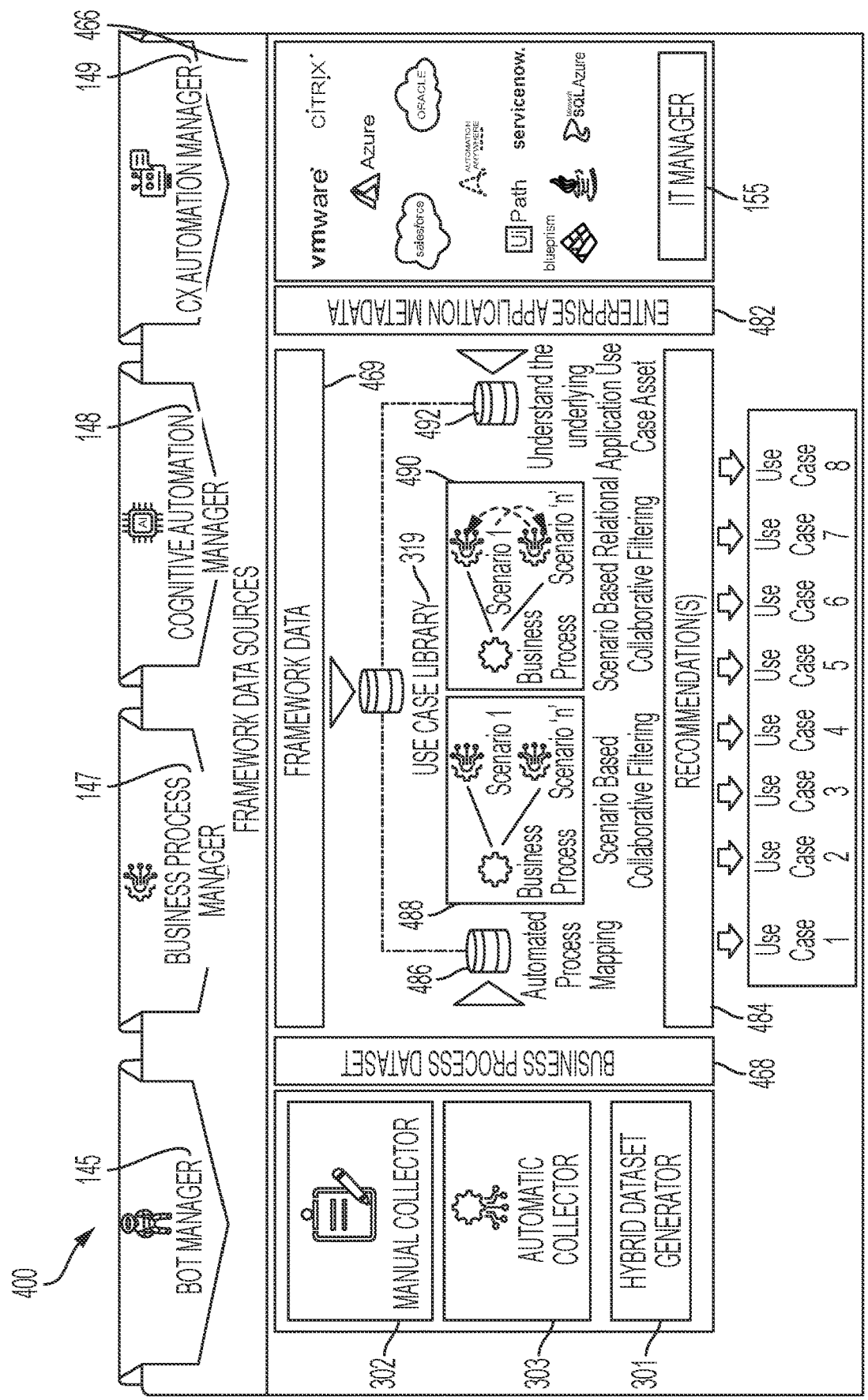
FIG. 4 illustrates an example of various components shown in FIGS. 1-3.

FIG. 4 illustrates an example 400 of various components shown in FIGS. 1-3. In the example 400, the hybrid dataset generator 301 generates a business process dataset 468 as described relative to FIG. 3. Also as described relative to FIG. 3, the business process dataset 486 is automatically mapped to multisource system data that is retrieved from a variety of sources, where the multisource system data can include, at least in part, preexisting datasets used by those sources. For example, as shown in FIG. 4, the multisource system data can include framework data 469 and enterprise application metadata 482.

According to the example of FIG. 4, the framework data 469 can be retrieved and/or derived from, for example, preexisting datasets maintained or used by framework data sources 466 that include the bot manager 145, the business process manager 147, the cognitive automation manager 148, and the CX automation manager 149. In similar fashion, the enterprise application metadata 482 can retrieved and/or derived from, for example, preexisting datasets maintained or used by the IT manager 155. The preexisting datasets maintained or used by the IT manager 155 can relate to each application or technology managed by the IT manager 155, or any subset thereof. The automatic mapping of the business process dataset 486 to the framework data 469 and the enterprise application metadata 482 can yield, for example, mapped business process dataset 486.

Still referring to FIG. 4, as described relative to FIG. 3, the mapped business process dataset 486, in combination with the use case library 319, can be used to detect scenarios, or use cases, for the user-executed process under analysis.

Further, the enterprise application metadata 482, which can include data regarding applications that are relied upon in a given scenario or use case, can be used as application context data 492 during scenario filtering. More particularly, scenario-based filtering can be performed such that, for example, scenarios 488 result from scenario-based collaborative filtering and scenarios 490 result from scenario-based relational filtering. In various embodiments, the scenarios 488 and the scenarios 490 can collectively represent a filtered scenario set that is used to produce one or more automation recommendations 484. The automation recommendations 484 can each relate, for example, to a scenario or use case for which automation is recommended (or not recommended).

Figure 5:
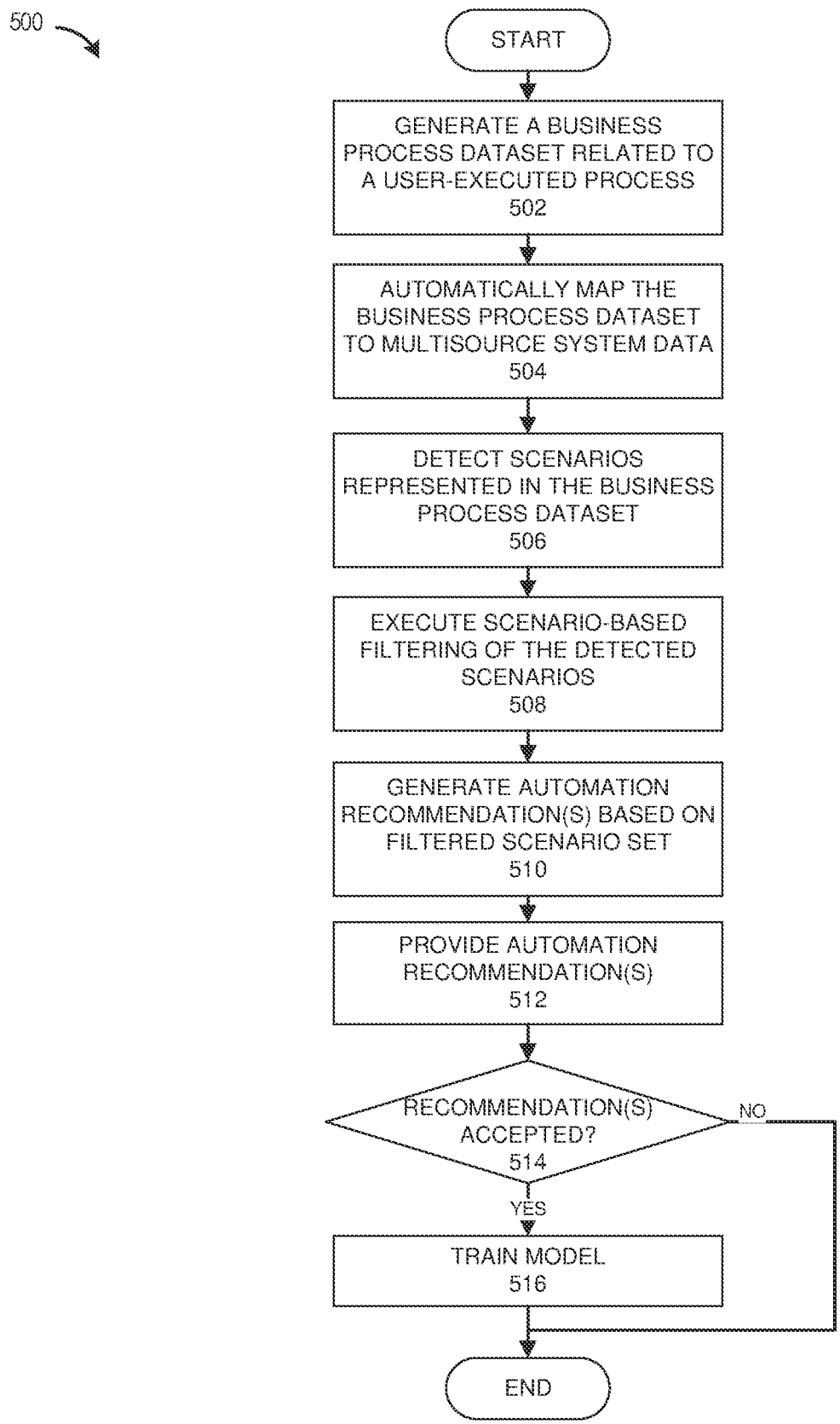
FIG. 5 illustrates an example of a process for operating a process automation advisor.

FIG. 5 illustrates an example of a process 500 for operating the process automation advisor 157 of FIGS. 1 and 3. In certain embodiments, the process 400 can be implemented by any system that can process data. Although any number of systems, in whole or in part, can implement the process 400, to simplify discussion, the process 300 will be described in relation to particular components shown and described relative to FIGS. 1-4.

At block 502, the hybrid dataset generator 301 generates a business process dataset relating to a user-executed process. In a typical embodiment, the user-executed process relates a process performed, at least in part, by one or more of the human workers 123, although that need not be the case. In some embodiments, for example, the process 500 may be used to evaluate an appropriateness of existing automation. At block 504, the ML-based analysis engine 304 automatically maps the business process dataset to multisource system data such as multisource system data that is retrieved from preexisting datasets maintained by variety of sources. The block 504 can yield a mapped business process dataset as described relative to FIGS. 3 and 4.

At block 506, the scenario detector 316 detects scenarios, or use cases, represented in the mapped business process dataset. At block 508, the scenario-based filtering engine 317 executes scenario-based filtering of the detected scenarios to yield, for example, a filtered scenario set. At block 510, the automation decision engine 318 generates one or more automation recommendations based on the filtered scenario set. At block 512, the automation decision engine 318 provides the one or more recommendations to a user or administrator. At decision block 514, the automation decision engine 318 determines whether the user or administrator has accepted any of the one or more recommendations. If not, the process 500 ends. Otherwise, if it is determined, at the decision block 514, that the user or administrator has accepted any of the one or more recommendations, at block 516, the ML model with which the automation decision engine 318 is configured, if any, is updated based on the accepted recommendation(s), thereby using the accepted recommendation(s) as training data. After block 516, the process 500 ends.

Figure 6:
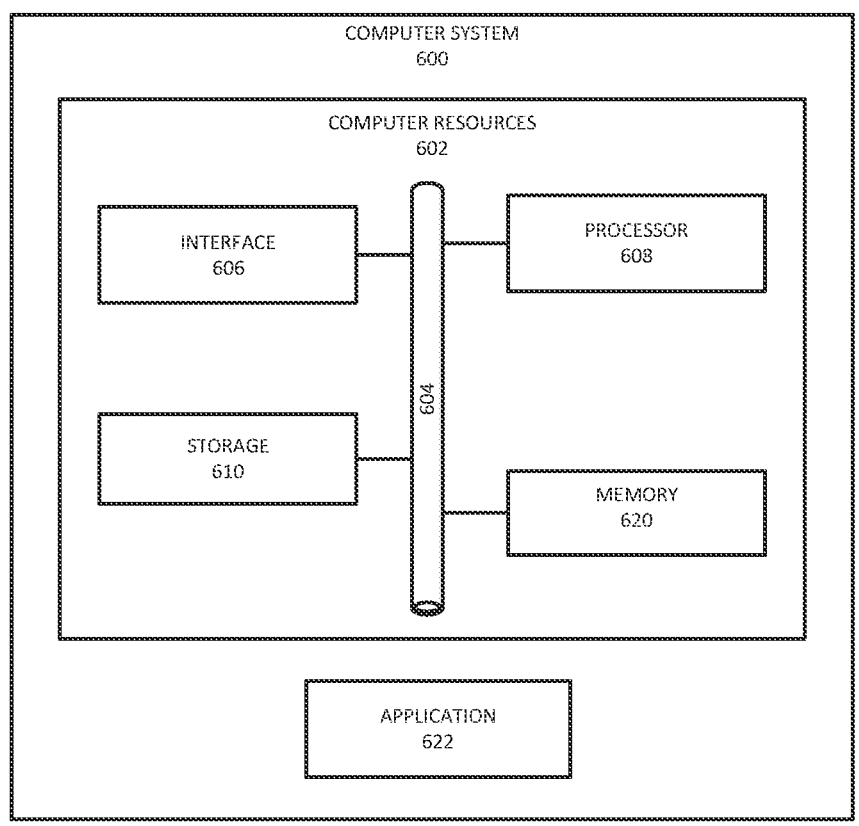
FIG. 6 illustrates an example of a computer system.

FIG. 6 illustrates an example of a computer system 600 that, in some cases, can be representative, for example, of the central management system 140, the RPA platforms 124, the tenant systems 110, the user systems 160 and/or a module or sub-component of the foregoing. The computer system 600 includes an application 622 operable to execute on computer resources 602. The application 622 can be, for example, any of the systems or modules illustrated in FIG. 1 or FIG. 2. In particular embodiments, the computer system 600 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the computer system 600 may comprise any suitable physical form, configuration, number, type and/or layout. As an example, and not by way of limitation, the computer system 600 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 600 may include one or more computer systems; be unitary or distributed; span multiple locations; span multiple machines; or reside in a cloud, which may include one or more cloud components in one or more networks.

In the depicted embodiment, the computer system 600 includes a processor 608, memory 620, storage 610, interface 606, and bus 604. Although a particular computer system is depicted having a particular number of particular components in a particular arrangement, this disclosure contemplates any suitable computer system having any suitable number of any suitable components in any suitable arrangement.

Processor 608 may be a microprocessor, controller, or any other suitable computing device, resource, or combination of hardware, software and/or encoded logic operable to execute, either alone or in conjunction with other components, (e.g., memory 620), the application 622. Such functionality may include providing various features discussed herein. In particular embodiments, processor 608 may include hardware for executing instructions, such as those making up the application 622. As an example, and not by way of limitation, to execute instructions, processor 608 may retrieve (or fetch) instructions from an internal register, an internal cache, memory 620, or storage 610; decode and execute them; and then write one or more results to an internal register, an internal cache, memory 620, or storage 610.

In particular embodiments, processor 608 may include one or more internal caches for data, instructions, or addresses. This disclosure contemplates processor 608 including any suitable number of any suitable internal caches, where appropriate. As an example, and not by way of limitation, processor 608 may include one or more instruction caches, one or more data caches, and one or more translation lookaside buffers (TLBs). Instructions in the instruction caches may be copies of instructions in memory 620 or storage 610 and the instruction caches may speed up retrieval of those instructions by processor 608. Data in the data caches may be copies of data in memory 620 or storage 610 for instructions executing at processor 608 to operate on; the results of previous instructions executed at processor 608 for access by subsequent instructions executing at processor 608, or for writing to memory 620, or storage 610; or other suitable data. The data caches may speed up read or write operations by processor 608. The TLBs may speed up virtual-address translations for processor 608. In particular embodiments, processor 608 may include one or more internal registers for data, instructions, or addresses. Depending on the embodiment, processor 608 may include any suitable number of any suitable internal registers, where appropriate. Where appropriate, processor 608 may include one or more arithmetic logic units (ALUs); be a multi-core processor; include one or more processors 608; or any other suitable processor.

Memory 620 may be any form of volatile or non-volatile memory including, without limitation, magnetic media, optical media, random access memory (RAM), read-only memory (ROM), flash memory, removable media, or any other suitable local or remote memory component or components. In particular embodiments, memory 620 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 620 may include one or more memories 620, where appropriate. Memory 620 may store any suitable data or information utilized by the computer system 600, including software embedded in a computer readable medium, and/or encoded logic incorporated in hardware or otherwise stored (e.g., firmware). In particular embodiments, memory 620 may include main memory for storing instructions for processor 608 to execute or data for processor 608 to operate on. In particular embodiments, one or more memory management units (MMUs) may reside between processor 608 and memory 620 and facilitate accesses to memory 620 requested by processor 608.

As an example, and not by way of limitation, the computer system 600 may load instructions from storage 610 or another source (such as, for example, another computer system) to memory 620. Processor 608 may then load the instructions from memory 620 to an internal register or internal cache. To execute the instructions, processor 608 may retrieve the instructions from the internal register or internal cache and decode them. During or after execution of the instructions, processor 608 may write one or more results (which may be intermediate or final results) to the internal register or internal cache. Processor 608 may then write one or more of those results to memory 620. In particular embodiments, processor 608 may execute only instructions in one or more internal registers or internal caches or in memory 620 (as opposed to storage 610 or elsewhere) and may operate only on data in one or more internal registers or internal caches or in memory 620 (as opposed to storage 610 or elsewhere).

In particular embodiments, storage 610 may include mass storage for data or instructions. As an example, and not by way of limitation, storage 610 may include a hard disk drive (HDD), a floppy disk drive, flash memory, an optical disc, a magneto-optical disc, magnetic tape, or a Universal Serial Bus (USB) drive or a combination of two or more of these. Storage 610 may include removable or non-removable (or fixed) media, where appropriate. Storage 610 may be internal or external to the computer system 600, where appropriate. In particular embodiments, storage 610 may be non-volatile, solid-state memory. In particular embodiments, storage 610 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 610 may take any suitable physical form and may comprise any suitable number or type of storage. Storage 610 may include one or more storage control units facilitating communication between processor 608 and storage 610, where appropriate.

In particular embodiments, interface 606 may include hardware, encoded software, or both providing one or more interfaces for communication (such as, for example, packet-based communication) among any networks, any network devices, and/or any other computer systems. As an example, and not by way of limitation, communication interface 606 may include a network interface controller (NIC) or network adapter for communicating with an Ethernet or other wire-based network and/or a wireless NIC (WNIC) or wireless adapter for communicating with a wireless network.

Depending on the embodiment, interface 606 may be any type of interface suitable for any type of network for which computer system 600 is used. As an example, and not by way of limitation, computer system 600 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 600 may include any suitable interface 606 for any one or more of these networks, where appropriate.

In some embodiments, interface 606 may include one or more interfaces for one or more I/O devices. One or more of these I/O devices may enable communication between a person and the computer system 600. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 606 for them. Where appropriate, interface 606 may include one or more drivers enabling processor 608 to drive one or more of these I/O devices. Interface 606 may include one or more interfaces 606, where appropriate.

Bus 604 may include any combination of hardware, software embedded in a computer readable medium, and/or encoded logic incorporated in hardware or otherwise stored (e.g., firmware) to couple components of the computer system 600 to each other. As an example, and not by way of limitation, bus 604 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 604 may include any number, type, and/or configuration of buses 604, where appropriate. In particular embodiments, one or more buses 604 (which may each include an address bus and a data bus) may couple processor 608 to memory 620. Bus 604 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 608 (such as, for example, one or more internal registers or caches), one or more portions of memory 620, one or more portions of storage 610, or a combination of these, where appropriate. In particular embodiments, a computer-readable storage medium implements RAM or ROM. In particular embodiments, a computer-readable storage medium implements volatile or persistent memory In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially Although certain computer-implemented tasks are described as being performed by a particular entity, other embodiments, are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system:
   receiving a process dataset comprising data related to a user-executed process;
   automatically mapping the process dataset to multisource system data deemed relevant to automation of the user-executed process, the automatically mapping comprising performing a plurality of machine learning (ML) analyses, wherein the plurality of ML analyses are each associated with a preexisting dataset that is not particular to the user-executed process, and wherein the multisource system data comprises at least a portion of the preexisting dataset of each of the plurality of ML analyses, the performing a plurality of ML analyses comprises, for each ML analysis of the plurality of ML analyses:
   receiving the process dataset;
   determining relevant data within the preexisting dataset; and
   performing a specific type of analysis using at least a portion of the relevant data and at least a portion of the process dataset, the specific type of analysis resulting in analytical data;
   detecting a plurality of scenarios in the user-executed process via the automatically mapped process dataset;
   performing scenario-based filtering of the plurality of scenarios; and
   automatically generating an automation recommendation for the user-executed process.

2. The method of claim 1, comprising generating at least a portion of the process dataset via interaction with a user.

3. The method of claim 1, comprising automatically generating at least a portion of the process dataset from recorded user interface (UI) activity data that has been automatically correlated to a plurality of steps of the user-executed process.

4. The method of claim 1, wherein the automatically mapping comprises performing a ML-based process analysis, the ML-based process analysis comprising at least one of the following: business process assessment, domain catalog mapping, sub-process analysis, automation existence analysis, process stability analysis, and decision-making analysis.

5. The method of claim 1, wherein the automatically mapping comprises performing an ML-based productivity analysis, the ML-based productivity analysis comprising at least one of the following: process schedule assessment, repetitive task analysis, volume analysis, average handle time (AHT) analysis, peak time analysis, peak volume analysis, service-level agreement (SLA) analysis, process change analysis, and process history analysis.

6. The method of claim 1, wherein the automatically mapping comprises performing an ML-based workforce analysis, the ML-based workforce analysis comprising at least one of the following: role mapping analysis, regional workforce analysis, stakeholder mapping, absenteeism analysis and attrition analysis.

7. The method of claim 1, wherein the automatically mapping comprises performing an ML-based underlying application analysis, the ML-based underlying application analysis comprising at least one of the following: application touchpoint analysis, application downtime analysis, application environment analysis, and application stability analysis.

8. The method of claim 1, wherein the automatically mapping comprises performing an ML-based insource/outsource analysis, the ML-based insource/outsource analysis comprising at least one of the following: data input and output analysis, information analysis, and storage analysis.

9. The method of claim 1, wherein the automatically mapping comprises performing an ML-based standard operating procedure (SOP) analysis, the ML-based SOP analysis comprising at least one of the following: process SOP assessment and Suppliers, Inputs, Process, Outputs and Customer (SIPOC) analysis.

10. The method of claim 1, wherein the automatically mapping comprises performing an ML-based environment analysis, the ML-based environment analysis comprising at least one of the following: server environment analysis, latency analysis, and downtime analysis.

11. The method of claim 1, wherein the automatically mapping comprises performing an ML-based risk analysis, the ML-based risk analysis comprising at least one of the following: negative scenario analysis, issue analysis, data security analysis, password policy analysis, and preexisting issue analysis.

12. The method of claim 1, wherein the detecting the plurality of scenarios in the user-executed process comprises matching at least a portion of the process dataset to a library of use cases.

13. The method of claim 1, wherein the performing scenario-based filtering of the plurality of scenarios comprises analyzing data related to an application that is utilized in the user-executed process.

14. The method of claim 1, wherein the scenario-based filtering comprises at least one of collaborative filtering and relational filtering.

15. The method of claim 1, wherein the automation recommendation comprises a recommendation to automate at least a portion of the user-executed process and identifies at least one of a customer experience (CX) automation platform and a robotic process automation platform.

16. The method of claim 1, comprising:
   publishing the automation recommendation to a user; and responsive to user acceptance of the automation recommendation, training a machine learning (ML) model for recommendations using the automation recommendation.

17. A computer system comprising a processor and memory, wherein the processor and the memory in combination are operable to implement a method comprising:

receiving a process dataset comprising data related to a user-executed process;

automatically mapping the process dataset to multisource system data deemed relevant to automation of the user-executed process, the automatically mapping comprising performing a plurality of machine learning (ML) analyses, wherein the plurality of ML analyses are each associated with a preexisting dataset that is not particular to the user-executed process, and wherein the multisource system data comprises at least a portion of the preexisting dataset of each of the plurality of ML analyses, the performing a plurality of ML analyses comprises, for each ML analysis of the plurality of ML analyses:

receiving the process dataset;

determining relevant data within the preexisting dataset; and performing a specific type of analysis using at least a portion of the relevant data and at least a portion of the process dataset, the specific type of analysis resulting in analytical data;

detecting a plurality of scenarios in the user-executed process via the automatically mapped process dataset;

performing scenario-based filtering of the plurality of scenarios; and automatically generating an automation recommendation for the user-executed process.

18. A computer-program product comprising a non-transitory computer-usable medium having computer-readable program code embodied therein, the computer-readable program code adapted to be executed to implement a method comprising:

receiving a process dataset comprising data related to a user-executed process;

automatically mapping the process dataset to multisource system data deemed relevant to automation of the user-executed process, the automatically mapping comprising performing a plurality of machine learning (ML) analyses, wherein the plurality of ML analyses are each associated with a preexisting dataset that is not particular to the user-executed process, and wherein the multisource system data comprises at least a portion of the preexisting dataset of each of the plurality of ML analyses, the performing a plurality of ML analyses comprises, for each ML analysis of the plurality of ML analyses:

receiving the process dataset;

determining relevant data within the preexisting dataset; and performing a specific type of analysis using at least a portion of the relevant data and at least a portion of the process dataset, the specific type of analysis resulting in analytical data;

detecting a plurality of scenarios in the user-executed process via the automatically mapped process dataset;

performing scenario-based filtering of the plurality of scenarios; and automatically generating an automation recommendation for the user-executed process.

* * * * *